United States Patent Office 3,336,186
Patented Aug. 15, 1967

3,336,186
METHOD OF COMBATING INSECTS AND ACARIDS WITH CERTAIN PHENYL-CARBAMATE DERIVATIVES
Horst Peissker, Wolfenbuttel, Albert Jäger, Berlin-Hermsdorf, Walter Steinhausen, Grossburgwedel, and Gerhard Boroschewski, Berlin-Charlottenburg, Germany, assignors to Schering, A.G., Berlin, Germany
No Drawing. Filed June 26, 1963, Ser. No. 290,586
Claims priority, application Germany, Aug. 2, 1962, Sch 31,834
1 Claim. (Cl. 167—30)

This invention relates to pesticides, and more particularly to novel carbamate derivatives which have insecticidal and acaricidal effects.

We have found that compounds of the formula

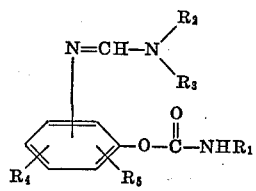

wherein $R_1$ is lower alkyl or cyclohexyl; $R_2$ and $R_3$ are lower alkyl or jointly constitute a divalent radical which forms a five- and six-member heterocyclic ring with the associated N atom containing in addition to said N atom only C atoms or an O atom and C atoms; $R_4$ and $R_5$ are hydrogen, lower alkyl, lower alkenyl, or halogen; are effective agents for combating insect pests and spider mites which are plant parasites. The compounds of the invention and their salts with any suitable acid are capable of surprisingly long action when incorporated in pesticidal compositions.

Such compositions are highly effective against a broad spectrum of pest insects. They may be employed to advantage where it is necessary to combat acarids and insects simultaneously, for example, in orchards, vineyards, truck gardens, and hop fields, in cotton crops, and in other crops in which insects may occur simultaneously with spider mites.

The compounds of the invention may be employed against pests in their pure form, in mixtures with each other and with other pest control agents such as acaricidal, insecticidal, or fungicidal compounds. They may constitute the active agents of compositions of all types commonly employed for the protection of crops against pests. Such compositions, in addition to the active agents, may contain liquid or solid inert carriers. Suitable liquid carriers include water, mineral oil, and other solvents. Solid inert carriers include bentonite, fuller's earth, gypsum, limestone, diatomaceous earth, pyrophyllite, silicon dioxide in its various natural forms, talcum, and powders of vegetable origin such as cotton seed flour or nut shell flour. The composition may contain conventional auxiliary agents such as emulsifiers, wetting agents, binders, stabilizers, propellent gases, perfumes, pest attracting and pest repelling agents. The composition may be applied by dusting or otherwise spreading when they are solid. When liquid, they may be applied by fogging, spraying, or atomizing. The liquid compositions may be suspensions, emulsions, or solutions of the active agents, and may also be applied in the form of aerosols or fumigants.

The percentage of active agents in the compositions may be varied within wide limits. The concentration selected will depend on the type of composition, the method of application, the desired pesticidal effect, and particularly on the type of pest to be controlled. The content of active agents in the compositions of the invention will usually vary between 0.1 and 90 percent by weight. The compositions are generally applied in concentrations between 0.025 and 10 percent. Under exceptional conditions, it may be necessary to apply them in concentrations as high as 20 percent.

Representative carbamate derivatives of the invention which have excellent insecticidal and acaricidal effects are listed in Table 1 together with identifying physical properties. Where the formula of an acid radical appears in conjunction with the name of its salt in Table 1, it will be understood that the compound is characterized by the melting point of its salt.

TABLE 1

| | | |
|---|---|---|
| I | $(CH_3)_2N-CH=N-\phantom{xx}\!\!\!\!\!\!\!\!\!\!\!\!\!\!\!\!$ ⟨phenyl⟩$-O-\overset{O}{\overset{\|}{C}}-NH-CH_3$ | M.P. 102–103° C. |
| II | $(CH_3)_2N-CH=N-$⟨phenyl⟩$-O-\overset{O}{\overset{\|}{C}}-NH-CH_3$ | M.P. 82–85° C. |
| III | $(CH_3)_2N-CH=N-$⟨phenyl, $CH_3$⟩$-O-\overset{O}{\overset{\|}{C}}-NH-CH_3$ | M.P. 110° C. |
| IV | $(C_2H_5)_2N-CH=N-$⟨phenyl, $CH_3$⟩$-O-\overset{O}{\overset{\|}{C}}-NH-CH_3$ | M.P. 178–179° C. (hydrochloride) |
| V | $(CH_3)_2N-CH=N-$⟨phenyl, $CH_3$⟩$-O-\overset{O}{\overset{\|}{C}}-NH-C_2H_5$ | Oil |
| VI | $(CH_3)_2N-CH=N-$⟨phenyl, $CH_2=CH-CH_2$⟩$-O-\overset{O}{\overset{\|}{C}}-NH-CH_3$ | M.P. 120–121° C. (Chloracetate) |
| VII | $(CH_3)_2N-CH=N-$⟨phenyl, $CH_3$, $CH_3$⟩$-O-\overset{O}{\overset{\|}{C}}-NH-CH_3$ | M.P. 156–157° C. |

TABLE 1—Continued

| | | |
|---|---|---|
| VIII | (C₂H₅)₂N—CH=N—[2,5-(CH₃)₂-C₆H₂]—O—C(=O)—NH—CH₃ | M.P. 86–87° C. |
| IX | (CH₃)₂N—CH=N—[2-CH₃-5-CH(CH₃)₂-C₆H₂]—O—C(=O)—NH—CH₃ | M.P. 127.5–128° C. |
| X | (C₂H₅)₂N—CH=N—[2-CH₃-5-CH(CH₃)₂-C₆H₂]—O—C(=O)—NH—CH₃ | M.P. 92.0–92.5° C. |
| XI | (C₂H₅)₂N—CH=N—[2-CH₃-4-CH(CH₃)₂-C₆H₂]—O—C(=O)—NH—CH₃ | M.P. 187–188° C. (Hydrochloride) |
| XII | (CH₃)₂N—CH=N—[2-CH₃-4-CH(CH₃)₂-C₆H₂]—O—C(=O)—NH—CH₃ | M.P. 103–104.5° C. |
| XIII | (C₂H₅)₂N—CH=N—[2-CH₃-4-CH(CH₃)₂-C₆H₂]—O—C(=O)—NH—CH₃ | Oil. |
| XIV | (CH₂CH₂)₂N—CH=N—[2,5-(CH₃)₂-C₆H₂]—O—C(=O)—NH—CH₃ | M.P. 185° C. |
| XV | piperidino—CH=N—[2,5-(CH₃)₂-C₆H₂]—O—C(=O)—NH—CH₃ | M.P. 85.0° C. |
| XVI | morpholino—CH=N—[2,5-(CH₃)₂-C₆H₂]—O—C(=O)—NH—CH₃ | M.P. 144–145° C. |
| XVII | (CH₃)₂N—CH=N—[3-CH₃-C₆H₃]—O—C(=O)—NH—CH₃ | M.P. 118–119° C. |
| XVIII | (CH₃)₂N—CH=N—C₆H₄—O—C(=O)—NH—(CH₂)₃—CH₃ | M.P. 61–65° C. |
| XIX | (CH₃)₂N—CH=N—[2-Cl-C₆H₃]—O—C(=O)—NH—CH₃ | M.P. 118–119° C. (Chloracetate) |
| XX | (CH₃)₂N—CH=N—[2-CH₃-C₆H₃]—O—C(=O)—NH—C₆H₅ | M.P. 100–103° C. |
| XXI | (CH₃)₂N—CH=N—[2,5-Cl₂-C₆H₃]—O—C(=O)—NH—CH₃ | M.P. 142.5–144° C. |
| XXII | (CH₃)₂N—CH=N—C₆H₄—O—C(=O)—NH—C₂H₅ | M.P. 105–108° C. |
| XXIII | (CH₃)₂N—CH=N—C₆H₄—O—C(=O)—NH—(CH₂)₂—CH₃ | Oil $n_{24}^D = 1.5450$. |

TABLE 1—Continued

| | | |
|---|---|---|
| XXIV | $(CH_3)_2N-CH=N-\underset{CH_3}{\overset{CH_3}{C_6H_2}}-O-\overset{O}{\underset{\|}{C}}-NH-C_2H_5$ | M.P. 146–147° C. |
| XXV | $\underset{N=CH-N(CH_3)_2}{C_6H_4}-O-\overset{O}{\underset{\|}{C}}-NH-CH_3$ | M.P. 125° C. |

The following examples are illustrative of the biological effects of the compounds of the invention.

Example 1

Bush beans (*Phaseolus vulgaris* L.) infested with spider mites of the species *Tetranychus urticae* KOCH in all stages of development were treated in the late two-leaf stage with aqueous suspensions and emulsions or solutions of salts of active agents of the invention in various concentrations. The compositions were applied by spraying from a spray gun having a glass nozzle at a pressure of 0.5 kg./cm.$^2$ gauge while the potted plants were moving on a rotating table. The amount of liquid applied was 50 milliliters, and ensured wetting of the three plants contained in each pot until excess liquid dripped from them. The mortality of the postembryonal stages of the parasites after seven days was recorded in percent of the parasites present. The results are listed in Table 2.

TABLE 2

| Compound Number | Concentration of active agent, percent | Mortality of adults and nymphs, percent | Mortality of emerging larvae, percent |
|---|---|---|---|
| I | 0.1 | 100 | 100 |
|  | 0.05 | 100 | 100 |
| I (Lactate) | 0.1 | 100 | 100 |
|  | 0.05 | 100 | 100 |
| I (Hydrochloride) | 0.1 | 100 | 100 |
|  | 0.05 | 100 | 100 |
| I (Dihydrogenphosphate) | 0.1 | 100 | 100 |
|  | 0.05 | 100 | 100 |
| II | 0.1 | 100 | 100 |
| III | 0.1 | 100 | 100 |
|  | 0.05 | 100 | 100 |
| IV | 0.1 | 100 | 100 |
|  | 0.05 | 100 | 100 |
| V | 0.1 | 100 | 100 |
|  | 0.05 | 100 | 100 |
| VI | 0.1 | 100 | 100 |
|  | 0.05 | 100 | 100 |
| VII | 0.1 | 100 | 100 |
|  | 0.05 | 100 | 100 |
| VII (Lactate) | 0.1 | 100 | 100 |
|  | 0.05 | 100 | 100 |
| VIII | 0.1 | 100 | 100 |
|  | 0.05 | 80 | 80 |
| IX | 0.1 | 80 | 80 |
| XI | 0.1 | 100 | 100 |
| XII | 0.1 | 80 | 50 |
| XIV | 0.1 | 100 | 100 |
| XV | 0.1 | 100 | 100 |
| XVI | 0.1 | 100 | 100 |
| XVII (p-toluene-sulfonate) | 0.1 | 100 | 100 |
|  | 0.05 | 100 | 100 |
| XVIII | 0.1 | 100 | 100 |
|  | 0.05 | 100 | 100 |
| XIX | 0.1 | 100 | 80 |
|  | 0.05 | 100 | 50 |
| XXIII | 0.1 | 90 | 90 |
| XXV | 0.1 | 100 | 100 |
|  | 0.05 | 100 | 100 |

Example 2

The residual effect of representative compounds of the invention was determined by treating bush bean plants in the late two-leaf stage as described in Example 1. Other potted plants were infected for the first time 24 hours after treatment of the first group of plants and again at intervals of two to four days by placing spider mite infected leaves of the first group on leaves of the healthy plants. The mortality of the spider mites on the second group of plants seven days after infection by the applied leaves are tabulated in Table 3.

TABLE 3

| Compound Number | Concentration of active agent, percent | Residual effect on postembryonal stages after— | | | | | |
|---|---|---|---|---|---|---|---|
| | | 1 day | 3 days | 6 days | 8 days | 10 days | 16 days |
| I | 0.01 | 100 | 100 | 100 | 100 | 90 | 90 |
|  | 0.005 | 100 | 100 | 95 | 100 | 90 | 40 |
| III | 0.01 | 100 | 100 | 95 | 100 | 100 | 95 |
|  | 0.005 | 100 | 100 | 100 | 60 | 80 | 80 |
| VII | 0.01 | 100 | 100 | 100 | 100 | 100 | 100 |

Example 3

The roots (*a*) or the stalks (*b*) of cut branches of bush bean plants free from parasites were placed in aqueous emulsions or salt solutions of several representative compounds of the invention when the plants were in the two-leaf stage. They were then infected by contact with leaves carrying spider mites, and a count of surviving parasites 48 hours after infestation gave the results listed in Table 4.

TABLE 4

| | Compound Number | Concentration of Active agent, percent | Mortality of postembryonal stages after seven days, percent |
|---|---|---|---|
| (a) | I (Hydrochloride) | 0.04 | 100 |
|  |  | 0.02 | 100 |
|  | III | 0.01 | 100 |
|  |  | 0.1 | 100 |
|  |  | 0.033 | 100 |
|  | VII | 0.01 | 60 |
|  |  | 0.1 | 100 |
|  |  | 0.05 | 100 |
|  |  | 0.025 | 100 |
| (b) | I (Hydrochloride) | 0.1 | 100 |
|  |  | 0.033 | 100 |
|  | III | 0.01 | 95 |
|  |  | 0.1 | 100 |
|  |  | 0.033 | 100 |
|  | VII | 0.01 | 50 |
|  |  | 0.1 | 100 |
|  |  | 0.05 | 100 |
|  |  | 0.025 | 100 |

Example 4

Bush bean seeds were placed in recesses of clay dishes, and the recesses were treated with solid mixtures of two parts of representative active agents of the invention and 98 parts kaolin. No unfavorable effects of the compounds of the invention could be observed in comparison tests between the treated seeds and untreated controls with respect to germination and growth. When the plants had reached the two-leaf stage, they were infected with moving spider mites in all postembryonal stages by application of leaves from infected plants. The mortality of the mites was determined after seven days, and the results obtained are listed in Table 5.

TABLE 5

| Compound Number | Grams active agent per 100 g. seed material | Mortality of postembryonal stages, percent |
|---|---|---|
| I | 4 | 100 |
|  | 2 | 70 |
| VII | 4 | 100 |
|  | 2 | 60 |

*Example 5*

Glass plates were treated with aqueous emulsions or solutions of salts of the compounds of the invention in various concentrations. The liquid compositions were applied in amounts of 4 milligrams per square centimeter by means of a spray gun having a glass nozzle at a pressure of 0.5 kilogram per square centimeter. The liquid coatings were permitted to dry, and the plates were placed as top covers on glass cylinders each containing 20 house flies (*Musca domestica* L.), four days old. The flies were fed during the experiments with an untreated solution of sugar.

The effects of the compounds on the flies after twenty hours exposure were determined by counting the dead flies, the flies recognizably damaged and lying on their backs, and the flies surviving without visible symptoms. The percentage effect of the various compounds of the invention was calculated according to Abbott's method. The results obtained are listed in Table 6.

TABLE 6

| Compound Number | Concentration of Active agent, percent | Percentage effect after 20 hours |
|---|---|---|
| I | 0.2 | 100 |
|  | 0.1 | 100 |
|  | 0.05 | 83 |
| I (Hydrochloride) | 0.2 | 100 |
|  | 0.1 | 100 |
| I (Lactate) | 0.2 | 100 |
|  | 0.1 | 100 |
| I (Dihydrogenphosphate) | 0.2 | 100 |
|  | 0.1 | 100 |
| II | 0.2 | 75 |
| III | 0.2 | 100 |
|  | 0.1 | 100 |
|  | 0.05 | 100 |
|  | 0.025 | 100 |
| IV | 0.2 | 93 |
| V | 0.2 | 100 |
|  | 0.1 | 100 |
| VII | 0.2 | 70 |
| XV | 0.2 | 60 |
| XVI | 0.2 | 73 |
| XVII | 0.2 | 100 |
|  | 0.1 | 68 |
| XIX | 0.2 | 100 |
|  | 0.1 | 68 |
| XXIV | 0.2 | 80 |

*Example 6*

The bottoms of Petri dishes were treated with various concentrations of compounds of the invention in aqueous emulsions or as solutions of their salts at a dosage of 4 milligrams per square centimeter. After drying of the liquid coatings, the dishes were stocked each with approximately 100 granary weevils (*sitophilus granarius* L.).

After 24 hours' exposure of the insects in a dark room in the open dishes, a differential count was made of weevils surviving without symptoms, dead weevils, and damaged weevils lying on their backs. The percentage effect was calculated according to Abbott's method, and the results are listed in Table 7.

TABLE 7

| Compound Number | Concentration of active agent, percent | Percentage effect after 24 hours exposure |
|---|---|---|
| I | 0.2 | 100 |
|  | 0.1 | 74 |
|  | 0.05 | 63 |
| II | 0.2 | 75 |
| III | 0.2 | 100 |
|  | 0.1 | 100 |
|  | 0.05 | 100 |
|  | 0.02 | 100 |
| IV | 0.2 | 100 |
|  | 0.1 | 100 |
|  | 0.05 | 100 |
|  | 0.02 | 78 |
| V | 0.2 | 100 |
|  | 0.1 | 100 |
|  | 0.05 | 90 |
| VIII | 0.2 | 100 |
|  | 0.1 | 100 |
|  | 0.05 | 90 |
| XI | 0.2 | 100 |
|  | 0.1 | 89 |
|  | 0.05 | 60 |
| XV | 0.2 | 100 |
|  | 0.1 | 85 |
| XVIII (p-Toluolsulfonate) | 0.2 | 61 |
| XXV | 0.2 | 100 |
|  | 0.1 | 94 |

*Example 7*

The stomach and contact effects of the insecticidal compounds of the invention were determined by treating shoots of tradescantia on a revolving turntable with aqueous emulsions, suspensions, or salt solutions of the compounds of the invention in amounts of 4 mg./cm.$^2$. After drying of the sprayed coatings, the treated plants were each stocked in a wire gauze cage with 15 fourth-stage larvae of stick insects (*Carausius morosus* Brunner) which had recently shed their skins. The effects of the compounds on the animals were evaluated daily by separate counts of dead animals, severely damaged animals which reacted to contact only by uncoordinated movement of the extremities, slightly damaged animals, and normal animals. The results of the test are listed in Table 8.

TABLE 8

| Compound Number | Concentration of active agent, percent | Percentage effect after three days |
|---|---|---|
| I | 0.1 | 100 |
|  | 0.05 | 100 |
| I (Hydrochloride) | 0.1 | 100 |
|  | 0.05 | 100 |
| I (Lactate) | 0.1 | 100 |
|  | 0.05 | 100 |
| I (Dihydrogen-Phosphate) | 0.1 | 100 |
|  | 0.05 | 100 |
| III | 0.1 | 100 |
|  | 0.05 | 100 |
|  | 0.025 | 100 |
| IV | 0.2 | 100 |
|  | 0.1 | 97 |
| V | 0.1 | 100 |
|  | 0.05 | 100 |
|  | 0.025 | 100 |
| VI (Chloracetate) | 0.1 | 100 |
|  | 0.05 | 100 |
|  | 0.025 | 60 |
| VII | 0.1 | 100 |
|  | 0.05 | 100 |
| IX | 0.1 | 100 |
|  | 0.05 | 100 |
| X | 0.1 | 100 |
|  | 0.05 | 100 |
| XII | 0.1 | 97 |
|  | 0.05 | 30 |
| XIV | 0.1 | 100 |
|  | 0.05 | 97 |
| XVI | 0.1 | 67 |
| XVII (p-Toluenesulfonate) | 0.1 | 100 |
|  | 0.05 | 100 |
|  | 0.025 | 93 |
| XIX | 0.2 | 100 |
|  | 0.1 | 83 |
| XX | 0.2 | 73 |
|  | 0.1 | 56 |
| XXI | 0.2 | 70 |
|  | 0.1 | 27 |

TABLE 8—Continued

| Compound Number | Concentration of active agent, percent | Percentage effect after three days |
|---|---|---|
| XXII | 0.2 | 83 |
|  | 0.1 | 60 |
| XXIII | 0.2 | 100 |
|  | 0.1 | 56 |
| XXIV | 0.1 | 100 |
|  | 0.05 | 100 |
|  | 0.02 | 56 |

Example 8

Tradescantia shoots were treated in the manner of Example 7 with aqueous emulsions or suspensions of active agents of the invention in uniform concentrations of 0.1 percent in amounts of 4 mg./cm.² The plants were stocked at various times after treatment with 15 experimental animals as described in Example 7. The results obtained were evaluated in the same manner as in Example 7, and are listed in Table 9.

TABLE 9

| Compound Number | Percentage effect on plants stocked after— | | | | | | |
|---|---|---|---|---|---|---|---|
|  | 3 days | 6 days | 9 days | 14 days | 21 days | 28 days | 28 days[1] |
| III | 100 | 100 | 100 | 100 | 100 | 100 | 100 |
| VII | 100 | 100 | 98 | 96 | 82 | 79 | 72 |

[1] The treated plants were showered prior to the test with an amount of 15 liters per square meter within 45 minutes, and were stocked with test animals after air drying.

Example 9

Young oak shoots having approximately equal amounts of leaves were treated with 4 milligrams of a sprayed aqueous coating of emulsions or suspension of compounds of the invention per square centimeter. The spraying was performed on a turntable in the manner described above. After drying, the shoots were stocked with 10 caterpillars (L IV stage, immediately after shedding of skins) of the gypsy moth (*Porthetria dispar* L.). The animals were retained in wire gauze cages. The effects of the pesticidal compounds were determined daily, and the efficiency was evaluated as described in Example 8. The percentage effects achieved after three days with representative compounds of the invention are listed in Table 10.

TABLE 10

| Compound No. | Concentration of active agent, percent | Percentage effect after 3 days |
|---|---|---|
| I | 0.2 | 100 |
|  | 0.1 | 100 |
|  | 0.04 | 80 |
| II | 0.2 | 100 |
|  | 0.1 | 90 |
| III | 0.2 | 100 |
|  | 0.1 | 100 |
|  | 0.05 | 100 |
|  | 0.01 | 100 |
| IV | 0.2 | 100 |
|  | 0.1 | 100 |
|  | 0.04 | 60 |
| V | 0.2 | 100 |
|  | 0.1 | 100 |
|  | 0.05 | 100 |
|  | 0.02 | 100 |
| VII | 0.2 | 100 |
|  | 0.1 | 100 |
|  | 0.05 | 100 |
|  | 0.025 | 100 |
|  | 0.01 | 100 |
| VIII | 0.2 | 100 |
|  | 0.1 | 100 |
|  | 0.05 | 100 |
|  | 0.02 | 60 |
| XI | 0.2 | 100 |
|  | 0.1 | 87 |
| XIII | 0.2 | 100 |
|  | 0.1 | 85 |
| XV | 0.2 | 100 |
|  | 0.1 | 100 |
| XVI | 0.2 | 100 |
|  | 0.1 | 100 |
|  | 0.05 | 100 |
| XVII | 0.2 | 100 |
|  | 0.1 | 100 |

The pesticidal compounds of the invention which had not been known before were prepared in the following manner:

0.05 mole of a formamidinophenol was dissolved in a solvent such as tetrahydrofuran or in a mixture of 0.5 to 5 parts by weight of tetrahydrofuran and one part of dimethylformamide. The solution was mixed by shaking at room temperature with 0.05 mole of an alkyl or cycloalkylisocyanate. The reaction mixture was left to stand 48 hours at room temperature. Crystallization started during this time. The mixture was then heated to a boil for half an hour, and thereafter the solvent was distilled off in a vacuum.

The residue was either recrystallized from a mixture of benzene and petroleum ether or from a mixture of tetrahydrofuran and petroleum ether. In another purification method the residue was dissolved in benzene or chloroform and passed over a chromatographic column of neutral aluminum oxide. The products obtained were oily in some cases, and were isolated either as oily liquids, or in the form of their crystallized solid salts, such as the hydrochloride, the lactate, the p-toluenesulfonate, or the chloracetate.

The following examples will illustrate the method of preparing the carbamate derivatives of the invention.

Example 10

32.84 grams (0.2 mole) of 3-(N,N-dimethylaminomethylenimino)-phenol were dissolved in a mixture of 120 milliliters tetrahydrofuran and 120 milliliters dimethylformamide, and the solution was left to stand 48 hours at room temperature. It was subsequently heated to a boil for 30 minutes, and the solvent mixture was evaporated in a vacuum. The oily residue was dissolved in chloroform, and filtered over aluminum oxide (neutral). After evaporation of the chloroform in a vacuum, the residue was crystallized in the presence of a small amount of ether, and was recrystallized from ethyl acetate. The yield was 26.6 grams (60%), the melting point 102–103° C.

The elementary analysis corresponded to that of the compound $C_{11}H_{15}N_3O_2$.

Calculated: C, 59.70; H, 6.83; N, 18.99. Found: C, 59.88; H, 7.14; N, 19.06, which is N-methyl-3-(N',N'-dimethylaminomethylenimino)-phenylcarbamate.

The phenols which were employed as starting materials for preparing the pesticidal agents of the invention were prepared as follows:

0.1 mole of a suitably substituted aminophenol was dissolved either in 25 milliliters dimethylformamide or in another suitable solvent, such as acetonitrile, in the presence of 0.1 mole dimethylformamide; 9.15 milliliters phosphorus oxychloride were added drop by drop with agitation while the temperature was held at or below 60° C. by means of external cooling. After completion of the phosphorus oxychloride addition, the mixture was agitated for 30 additional minutes at 60° C. When ethanol was added and the mixture was cooled to room temperature, crystallization of the desired hydrochloride usually occurred very rapidly. If necessary, crystallization was made more complete by addition of ethyl ether.

If the hydrochloride obtained was not satisfactorily pure, it was recrystallized from ethanol or from a mixture of ethanol and ether. It was then dissolved or suspended in water, and an equivalent amount of a strong base such as triethylamine, NaOH or $Na_2CO_3$ was added whereupon the free phenol crystallized. If necessary the aminophenol was recrystallized from a mixture of tetrahydrofuran and a light petroleum fraction.

The pesticidal compounds of the invention may also be prepared by reacting a corresponding phenol with a mono-substituted carbamic acid chloride in a manner well known in itself.

While the invention has been described with particular reference to specific embodiments, it is to be understood that it is not limited thereto, but is to be construed broadly, and restricted solely by the scope of the appended claim.

We claim:

A method of combating insects and acarids which comprises contacting said insects and acarids with a pesticidal amount of a compound of the formula

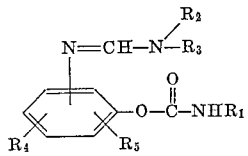

wherein $R_1$ is selected from the group consisting of lower alkyl and cyclohexyl; $R_2$ and $R_3$ are lower alkyls and $R_2$ and $R_3$ together with the nitrogen atom is a heterocyclic ring selected from the group consisting of five member and six-member heterocyclic rings containing in addition to said nitrogen atom only carbon atoms, and of six-member heterocyclic rings containing in addition to said nitrogen atom an oxygen atom and carbon atoms; and $R_4$ and $R_5$ are members of the group consisting of hydrogen, lower alkyls, lower alkenyls, and halogen.

References Cited

UNITED STATES PATENTS

| | | | |
|---|---|---|---|
| 2,984,682 | 5/1961 | Kaeding | 260—479 |
| 3,012,068 | 12/1961 | Shulgin | 260—482 |
| 3,071,506 | 1/1963 | Gruenhagen | 167—33 |
| 3,072,648 | 1/1963 | Bonvicino | 260—240 |
| 3,072,649 | 1/1963 | Semb et al. | 260—240 |
| 3,080,279 | 3/1963 | Constantin et al. | 167—33 |

ALBERT T. MEYERS, *Primary Examiner.*

LEWIS GOTTS, JULIAN S. LEVITT, *Examiners.*

G. A. MENTIS, R. S. BARRESE, *Assistant Examiners.*